(No Model.)

W. O. DUNBAR.
SPEED INDICATOR AND RECORDER.

No. 257,480. Patented May 9, 1882.

Witnesses.
S. N. Piper
E. P. Pratt

Inventor.
Wm. Otis Dunbar,
by R. H. Eddy, atty

UNITED STATES PATENT OFFICE.

WILLIAM O. DUNBAR, OF ALTOONA, PENNSYLVANIA.

SPEED INDICATOR AND RECORDER.

SPECIFICATION forming part of Letters Patent No. 257,480, dated May 9, 1882.

Application filed November 7, 1881. (No model.)

*To all whom it may concern:*

Be it known that I, WILLIAM OTIS DUNBAR, of Altoona, of the county of Blair and State of Pennsylvania, have invented a new and useful Improvement in Odometers or Speed-Indicators; and I do hereby declare the same to be described in the following specification and represented in the accompanying drawings, of which—

Figure 1:
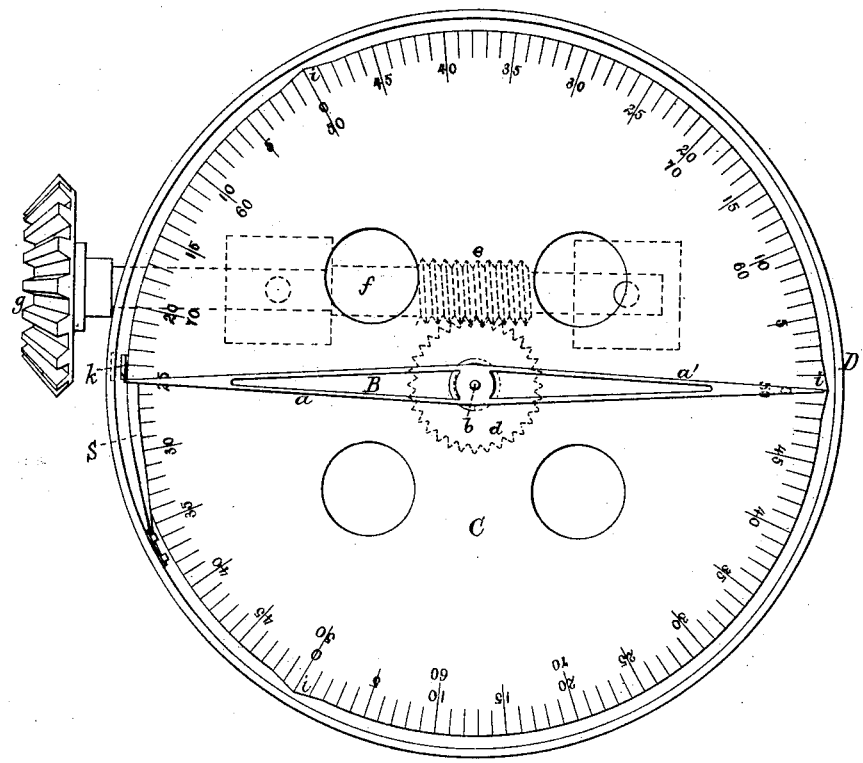
Figure 2:
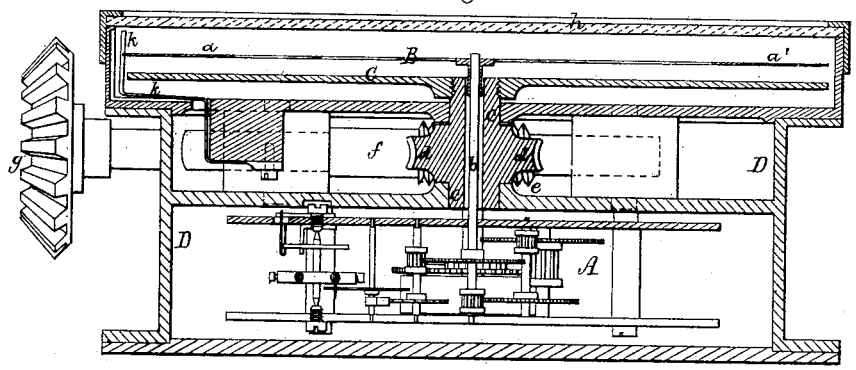
Figure 3:
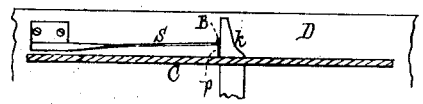

Figure 1 is a front view, and Fig. 2 a transverse section, of a speed-indicator of my new or improved kind, which is for indicating, and also for registering, if desirable, the speed of a vehicle, particularly that of a railway carriage or train, for which it is specially designed. Fig. 3 is hereinafter described.

The particular odometer constituting my invention is to indicate as often as may be necessary the speed at which the vehicle or train may have been going during any minute or fractional part thereof just past, and also to record the highest speed made.

In carrying out my invention, I have combined with a common clock or mechanism to beat seconds or parts of seconds of time a rotary dial and mechanism for effecting the stopping and starting of the time-piece second-hand, as hereinafter described, the said dial to be connected with a wheel, or axle thereof, of a carriage by mechanism which will revolve it (the said dial) once to the number of revolutions per minute which the wheel may make at an adopted maximum speed per hour of the carriage. In other words, if we suppose a locomotive-engine to be provided with the speed-indicator, there should be applied to an axle of one of the wheels of the engine and to the dial of the speed-indicator mechanism or a train of gears which will cause the dial to make one revolution or revolve a certain distance or amount to the number of revolutions made in a minute by the wheel at the maximum rate of speed. I have also combined with such, the time-piece rotary dial, and mechanism for effecting the stopping and starting of the second-hand of the time-piece, a recording device or marker, as hereinafter explained.

In the drawings, A denotes a common clock, unprovided with hour and minute hands, but having a hand, B, for beating seconds or parts of seconds of time, such hand being represented as having two fingers, $a\ a'$. It may have one or more of such fingers, as may be desirable, each being to radiate from the center or axis of the hand. When the hand may have a series of such fingers they are to be arranged at equal arcal distances apart.

Below the hand B, and concentric with its arbor $b$, and to revolve independently thereof, is the rotary dial C, whose arbor $c$ is provided with a gear, $d$, to engage with a worm, $e$, fixed on a shaft, $f$, provided at one end with a bevel-gear, $g$.

The mechanism above described is arranged within a suitable box or case, D, having over the second-hand and dial a glass or transparent covering-plate, $h$.

The dial is represented as having on it at its outer edge a series of one hundred and fifty arcal divisions, arranged and numbered as shown. It also has projecting from it at its periphery three cams, $i$, each of which is at one of the three zero-divisions. These cams while the dial may revolve successively meet and force aside a spring, $k$, fastened to the case, and arranged therein in manner and to project above the dial as shown.

The spring is to stop the second-hand, which it will do on either finger of such hand being carried around against it, (the said spring,) each of the cams being to push the spring away from the finger, so as to allow the second-hand to be started by the clock-work thereof.

The odometer, as represented in the aforesaid drawings, is calculated to indicate any amount of speed per hour, up to seventy-five miles, which is assumed to be the maximum speed, or that beyond which the carriage or railway car or train will not be run. If, now, we suppose the dial to revolve but once to the number of revolutions per minute which the carriage-wheel may make while running at this maximum rate of speed, we shall see that as the speed may diminish the dial will not revolve so fast as the second-hand.

As hereinbefore stated, the dial is represented as divided at its edge into one hundred and fifty equal arcs, or as having that number of graduations, there being fifty of them extending from each of the three cams $i$. The numbers 60 and 70 are arranged opposite the numbers 10 and 20 of each of the three arcal scales numbered 0, 10, 20, 30, 40, and 50.

The dial shown in the drawings is so graduated that the numbers to the divisions indicate the speed in miles per hour. For example, if the second-hand B should be stopped over 5 on the dial it would mean, at the instant the hand was stopped, a speed of five miles per hour. If stopped over 10, it would mean or indicate a speed of ten miles per hour, and so on, up to the assumed maximum speed of seventy miles per hour.

The numbers 60 and 70, as arranged opposite the numbers 10 and 20 of each of the three arcal scales of the dial, serve to aid in indicating the speed above fifty miles per hour.

The reason why I have arranged the numbers on the dial as above described may be thus explained: It is not often that a railway-train is run at a speed above fifty miles per hour, and therefore I have numbered the dial from 0 to 50, and provided it with three cams, $i$, in order that, if desired, an attendant can note the speed three times per minute. In other words, he will not be obliged to consume so much time in noting the speed when below fifty miles per hour as he would were the dial numbered 0 to 75 successively, and therefore provided with but two cams $i$. But should the train be running at a speed above fifty miles per hour, and the attendant, in noting the speed, should observe that the hand stopped over the numbers 10 and 60, he would know the train to be moving at a speed of sixty miles per hour, as the difference in speed between ten and sixty miles per hour would be apparent to any one.

For convenience of noting the speed as often as once each half-revolution of second-hand, the second-hand has two fingers. Should it be desirable to oftener note the speed, there may be a greater number of the fingers, with suitable divisions and cams therefor to the dial.

While the carriage or train may be advancing the dial will be in revolution, the second-hand being stopped whenever one of its fingers may bring up against the stopping-spring. The hand will be next started when such spring may be next pushed outward by a cam of the dial. Thus the hand will be started when a zero-division of either scale of the dial may be directly underneath the stopped finger of such hand. The hand will next be intermittently revolved, so as to beat seconds, until it may be again stopped by the spring. The dial, however, in case the speed of the carriage may be less than the assumed maximum rate, will revolve at a rate less than that of the hand, and the instant the said hand may be stopped the division indicative of the speed will be found to be directly under the stopped finger, and should be noted by an attendant.

The recording-spring or marker is shown at S as fixed to the case and projected over the dial. A side view of such marker is shown in Fig. 3. As the second-hand may revolve a finger of it, in passing over the marker, will gradually depress it and cause its point $p$ to be forced into contact with the dial at the division indicative of the speed, the marker at such time making a dot or mark to indicate the speed at the stoppage of the hand. In this case the face of the dial should be of such nature as will enable the dial to receive such a mark, the marker being also of a character to make a suitable mark.

My invention is not to be restricted to the precise mode represented for arranging and numbering the divisions of the dial, as such may be varied as circumstances may require.

What I claim as my invention is as follows, viz:

1. The combination, with the time-piece provided with the hand, as described, of the rotary dial and mechanism for effecting the stopping and starting of the said hand, as explained, while such dial may be in revolution, as specified.

2. The combination of the marking device or spring S with the time-piece, and with the rotary dial and mechanism for effecting the stopping and starting of the time-piece hand, as explained, while such dial may be in revolution, as specified.

WM. OTIS DUNBAR.

Witnesses:
JAMES A. BRENAMAN,
JOHN LEE.